US005731802A

United States Patent [19]

Aras et al.

[11] Patent Number: 5,731,802

[45] Date of Patent: Mar. 24, 1998

[54] TIME-INTERLEAVED BIT-PLANE, PULSE-WIDTH-MODULATION DIGITAL DISPLAY SYSTEM

[75] Inventors: Richard John Edward Aras, Santiago, Chile; Paul A. Alioshin, San Francisco; Bryan P. Straker, Los Gatos, both of Calif.

[73] Assignee: Silicon Light Machines, Sunnyvale, Calif.

[21] Appl. No.: 635,479

[22] Filed: Apr. 22, 1996

[51] Int. Cl.$^6$ .................... H04N 5/70

[52] U.S. Cl. .................... 345/148; 345/84; 345/89; 345/98; 345/147; 345/150

[58] Field of Search .................... 345/84, 87, 89, 345/98, 112, 147, 148, 150, 185, 197

[56] References Cited

U.S. PATENT DOCUMENTS

| | | | |
|---|---|---|---|
| 4,021,607 | 5/1977 | Amano | 358/230 |
| 5,185,602 | 2/1993 | Bassetti, Jr. et al. | 340/793 |
| 5,196,839 | 3/1993 | Johary et al. | 340/793 |
| 5,293,159 | 3/1994 | Bassetti, Jr. et al. | 345/149 |
| 5,497,172 | 3/1996 | Doherty et al. | 345/85 |
| 5,523,803 | 6/1996 | Urbanus et al. | 348/771 |
| 5,548,301 | 8/1996 | Kornher et al. | 345/85 |
| 5,619,224 | 4/1997 | Hoshino et al. | 345/98 |

*Primary Examiner*—Kee M. Tung
*Assistant Examiner*—Vincent E. Kovalick
*Attorney, Agent, or Firm*—Haverstock & Associates

[57] ABSTRACT

A time interleaved bit addressed weighted pulse width modulation (PWM) method and apparatus reduces the bandwidth requirement necessary for providing a plurality of data entries regarding multiple points of information. As is well known, a weighted PWM scheme modulates an output by utilizing a frame time that is divided into events of varying durations; most conventional schemes have each bit in the frame being half the duration of its predecessor. The modulated signal is activated during all, some or none of the events in the frame to develop a signal representing a particular parameter. This method and apparatus can be used in a display for selecting among varying levels of gray scale or from among multiple colors on a palette. In one application for a display, a register containing the same number of data pits as pixels in a row of the display is provided. The register is loaded with one bit per frame for each pixel in the entire row. The bandwidth is reduced because the bit for each of the pixels are not all for the same weight event. This allows a bit for a long duration event to be displayed in one pixel, while more than one bit for shorter duration events to be displayed in another pixel. This obviates the need to load one bit for each pixel in the row during the shortest event duration. The organization of the sequence of the events amongst the various rows can be pseudo-random to achieve reduced bandwidth. If the organization is pseudo-random the order can be pre-selected for an optimized bandwidth or organized into a predetermined format to achieve a pseudo-random effect.

27 Claims, 10 Drawing Sheets

TIME-INTERLEAVED BIT-PLANE, PULSE-WIDTH-MODULATION DIGITAL DISPLAY SYSTEM

FIELD OF THE INVENTION

This invention relates to the field of pulse width modulation (PWM) techniques. More particularly, this invention relates to a method of and an apparatus for providing gray scale or colors on a digital display where bits of different weights are time interleaved in order to minimize data bandwidth peaks.

BACKGROUND OF THE INVENTION

Using PWM for forming gray scale in display technologies is well known. The techniques for using PWM to generate gray scale are directly applicable to technologies using PWM to generate color in display technologies. To avoid obscuring the present invention in unnecessary and extraneous detail, the prior art and the invention will be described relative to the formation of a black and white gray scale display only. It will be apparent to one of ordinary skill in the art that these techniques can be directly applied to forming a color display. It is well understood that such gray scale techniques can be applied to color systems to formulate varying intensities of color. It will be understood that colors are also contemplated within the teachings of the invention.

When displaying an image on a digital display, a pixel is either 'on' or 'off'. To form a more variable image it is desirable to provide selectable gray scale. Such increased variability can be used to provide more information or more realism in an image. For example, consider a display where an 'on' pixel is white and an 'off' pixel is black. To achieve an in-between state, eg., gray, the pixel can be toggled equally between 'on' and 'off'. If the pixel display duration is sufficiently short, the viewer's eye/brain system automatically integrates this toggled pixel to perceive a gray image rather than black or white. To achieve a lighter or darker gray, the duty cycle for toggling the pixel can be adjusted so the pixel is on more or less of the time, respectively.

The technique described immediately above is conventionally known as pulse-width modulation (PWM). It is well known to implement a PWM scheme as either unweighted or weighted. FIG. 1 illustrates a conventional 3-bit unweighted scheme. According to the unweighted scheme, a pixel's image display cycle, commonly known as a frame, is divided into seven equal time slots. Each pixel is selected to be on or off for the duration of the time slot by the writing of the corresponding data value. Pixels can be activated during any number of the slotes from zero through seven. Providing the frame rate is high enough, the same intensity will be achieved with any ordering of the bits. Thus, in the system of FIG. 1, there are eight distinct intensity levels ranging from having a pixel off during all time slots to having a pixel on in all time slots.

FIG. 2 illustrates a conventional binary weighted 8-bit PWM scheme. In this scheme, each event has a distinct duration which is half that of its predecessor. In this way, the intensity of the pixel can be selected using conventional binary coding. In the general weighted case, the frame-time is divided into N events, with the duration of each event selected by the weight of the bit. In an N-bit system, the frame-time is divided into $\frac{1}{2}^{n-1}$ where n={0,N} and the sum of all intervals is $\frac{1}{2}+\frac{1}{4}+ \ldots +\frac{1}{2}^{N}$. The shortest duration event, corresponding to the least significant bit, is frame-time/$(2^N-1)$. Thus, the scheme illustrated in FIG. 2 can select among 256 (0 to 255) levels of gray scale from black to white.

The present invention has been designed for inclusion into a display system that includes a plurality of pixels arranged in an array of rows and columns. The system includes 1024 rows of pixels, each having 1280 pixels arranged in columns. A row of 1280 registers is loaded with the display data and the data is then written into the display. Shift registers are used to sequentially store the data for a row of pixels. The time available for loading a row of data into the shift registers is $\Lambda$/(# of rows), where $\Lambda$ is the pixel display duration and the # of rows is 1024 in this example. Therefore, the required data bus peak bandwidth for the electronics supplying data to the shift registers is (# of rows)/$\Lambda \times 1280$. It is well understood that the cost of a system can increase significantly with increased peak bandwidth requirement.

According to conventional practice in a PWM system, the data for the longest duration event $\Lambda_1$ is loaded and displayed, then the next longest event $\Lambda_2$ and so on until the data for the shortest event $\Lambda_N$ is loaded and displayed. Because all 1024 data bits must be loaded and then displayed during the time for the shortest event $\Lambda_N$, this causes the limiting factor for the bandwidth of the system.

FIGS. 3A, B and C show a graphical representation of the timing necessary for loading and displaying a row of pixels of a display system using a four bit weighted gray scale. In the example of FIGS. 3A, B and C, there are four bits of gray scale data so that there are 16 different levels of gray. The graphical representation of FIG. 3A shows time on the horizontal axis and the lines for displaying a single row of the display on its vertical axis. It will be understood that the time axis of FIG. 3A repeats for each column of the display to form a complete image in a single frame. Once the frame is displayed, the process for forming a frame repeats itself indefinitely to form each subsequent frame in a display sequence.

According to conventional practice, the data for bit 3 (the longest duration bit) for all the rows are loaded sequentially into the display. The data is displayed for the duration of the event as is schematically shown in FIG. 3A. Once the duration for bit 3 expires, the data for bit 2 is written to the display. Once the duration for bit 2 expires, the data for bit 1 is written to the display. Once the duration for bit 1 expires, the data for bit 0 is written to the display. Finally, once the duration for bit 0 expires, the data for bit 3 for the next frame is written to the display. This process of displaying the data for bit 3 must be completed within the duration of the event for bit 0.

In many systems only one row can be written within one cycle such that the data for the 1024 rows cannot be simultaneously loaded into the display. The sloped line 100 (FIG. 3A) schematically represents the timing for loading the register with bit 3 data during the display time for event 0. It will be apparent to one of ordinary skill in the art that the bandwidth necessary to load 1280 bits of data for bit 3 of the next row during the display time for bit 0 of the present row is high. Consider, for example, that the frame rate for the display is 60 Hz, i.e., the entire frame is drawn 60 times per second such that a frame is drawn in ≈16.667 mSeconds. Assuming the display has 1024 rows, each row must be displayed in ≈16.28 μSeconds. If 8 bit weighted gray scale is used, the shortest duration event is ≈64 nSeconds. This means that all 1280 bits of the next row must be written in ≈64 nSeconds or ≈800 pSeconds per word if loaded 16 bits at a time. This translates to ≈1.25 GHz bandwidth. Naturally, these numbers are representational only. For example, the 60 Hz frame rate was drawn from standard television display technology. Other frame rates would apply for digital video signals such as produced by a high resolution computer graphics application that would typically utilize a 1280×1024 display.

FIG. 3B is a timing diagram accurately depicting the events of FIG. 3A. Rather that showing the fictional view of all events in successive rows happening simultaneously, the events for successive rows are shown actually occurring at successive cycles. FIG. 3C shows graphically the bandwidth requirements for loading data into the rows for a system built according to the timing of FIG. 3B. As shown, the bandwidth requirements are high during the time that the data is transferred to the display. Accordingly, a system built according to the timing diagram of FIG. 3B will have a bandwidth requirement as described above, as prescribed by the shortest duration bit weight of the binary coding scheme. Thus, for any of the longer weighted bits, the bandwidth requirements falls to zero during significant portions of the frame time causing unwanted 'dead times'. In other words, the bandwidth requirements of this system are either at a maximum level or at a zero level.

It is well understood that the bandwidth cannot be reduced by simply lengthening the duration of all the events. Consider for example that an intermediate gray level is desired. If the duration of the frame and appropriate event are sufficiently long, the displayed pixel(s) will appear to flicker rather than appear as the intermediate gray level. Thus, it is important that the display time for all of the events not be too long.

One solution to this problem was proposed in U.S. patent application, Ser. No. 08/482,192, filed Jun. 7, 1995, and entitled CLEAR-BEHIND MATRIX ADDRESSING FOR DISPLAY SYSTEMS, which is incorporated herein by reference. According to that invention, a dead zone is provided in each of the pixel display frames. The shortest one or more events are provided a longer event duration to prevent the bandwidth requirements of the system from becoming burdensome. Unfortunately, with that system a portion of the available display intensity is lost due to the dead zone, and bandwidth is not optimal.

What is needed is a display system that provides gray scale using a weighted PWM scheme which does not flicker and provides a reduced bandwidth requirement for the associated control circuitry and data bus.

SUMMARY OF THE INVENTION

An algorithmic time-interleaved bit-plane, pulse-width-modulation (PWM) digital display system method and apparatus reduces the bandwidth requirements necessary for providing a plurality of data entries representing multiple points of information. For a properly designed system according to the present invention the bandwidth requirements are constant, and for at least one system of measurement, optimal. As is well known, a weighted PWM scheme modulates an output by utilizing a frame duration that is divided into events of varying durations; most conventional schemes have each bit in the frame being half the duration of its predecessor. The modulated signal is activated during all, some or none of the events in the frame to develop a signal representing a particular parameter. This method and apparatus can be used in a display for selecting among varying levels of gray scale or from among multiple colors on a palette. In one application for a display, a register containing the same number of data bits as pixels in a row of the display is provided. The register is loaded, one row at a time, with one bit per column for each pixel in the entire row. Preferably, the duration for successively display rows is dissimilar thereby reducing the bandwidth requirements. This allows a bit for a long duration event to be displayed in one row, while bits for shorter duration events are displayed in other rows. This obviates the need to successively load the data for the shortest duration bits in all the rows. The organization of the sequence of the events amongst the various rows can be arranged to achieve reduced bandwidth. If the organization is chosen in a pseudo-random manner, the order can be pre-selected for an optimized bandwidth or organized into a predetermined format to achieve an improved visual effect.

DETAILED DESCRIPTION OF THE PREFERRED EMBODIMENT

Figure 1:
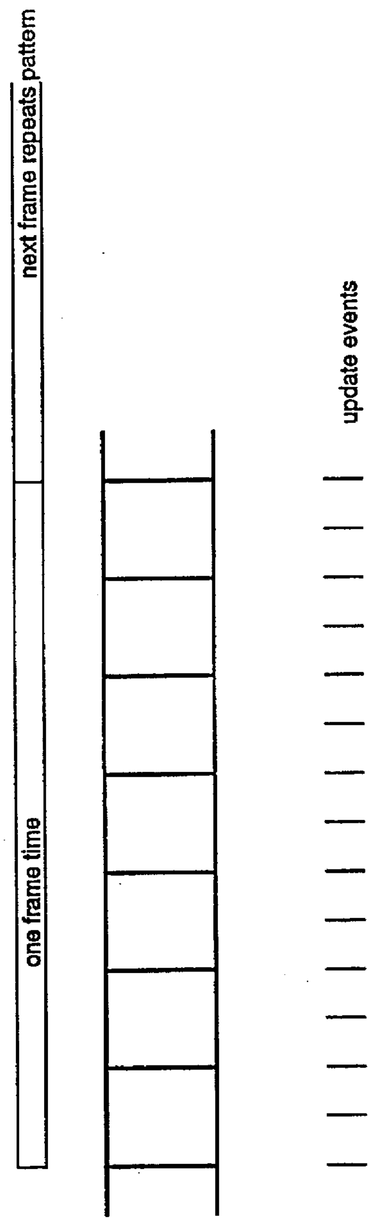
FIGURE 1 (prior art)
FIG. 1 shows a timing diagram for an unweighted PWM scheme in the prior art.
Figure 2:
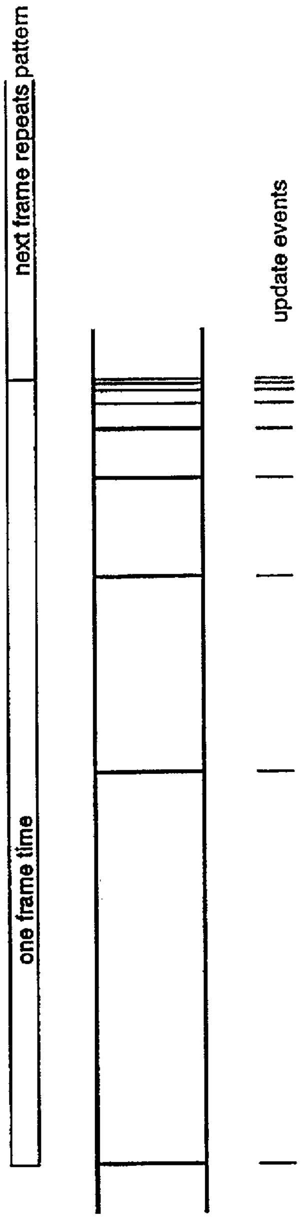
FIGURE 2 (prior art)
FIG. 2 shows a timing diagram for a weighted PWM scheme in the prior art.

The present invention for a time-interleaved bit-plane PWM technique was developed to provide gray scale for a display. In the preferred embodiment, the display is formed of an array of diffraction grating elements, such as disclosed in the Bloom, et al., U.S. Pat. No. 5,311,360, issued May 10, 1994 which is incorporated herein by reference. According to the preferred embodiment of the present invention the array of diffraction grating elements are arranged in rows and columns to form pixels of a display. In an array of the preferred embodiment there are 1024 rows and 1280 columns of pixels. The array can be formed of single grating pixels for a black and white display or time sequential multiplexing of pixels for color. Also, the pixels can be formed using multiple grating elements for each pixel to form a color display.

Through the use of the diffraction grating, light from an illumination source can be made to selectively enter the display optics of display. When the light from a pixel enters the display optics, that pixel appears lighted. Various levels of gray scale are formed by lighting the pixel varying percentages of time, i.e., by modulating the pulse width. The preferred embodiment utilizes a weighted PWM scheme to form the gray scale selections.

A conventional display draws (illuminates) one pixel at a time as it scans the beam over the entire surface of the display. Unlike conventional displays, all the pixels in a single row of the diffraction grating light valve can be updated simultaneously in the preferred embodiment. Accordingly, the descriptions of the invention that follow will be directed toward displaying a row at a time. Nevertheless, it will be apparent to one of ordinary skill in the art that the techniques of the present invention can equally be applied to other types of devices that utilize a PWM scheme for generating gray scale.

The preferred embodiment will be described relative to the display of a single graphical image, ie., one frame. Each frame includes 1280×1024 pixels for a total of 1,310,720 pixels. Assuming an 8-bit weighted gray scale, 10,485,760 data bits are required to define a single frame. According to the present invention, each row of the graphical image is formed, one row at a time. Because of the ability to draw the display, one row at a time, the number of rows multiplied by the number of bits in gray scale weighting is equal to the number of update events per frame or write cycles per frame. Thus, there are 1024×8 events to draw a frame. Note that an event is the transfer of pixel data from a row-wide register into a row. It will be readily understood that a number of operations (such as memory cycles) may be necessary to fill the register with the pixel data for the row.

The row image is displayed during one frame time such that the eight bits for each pixel in the row are appropriately presented to the viewer's eye. The viewer's eye/brain system then integrates the 8 weighted bits for each pixel into a row of pixels each of the appropriate gray scale. Similarly, the viewer's eye/brain system integrates the display for each row into a single graphical image.

Figure 4:
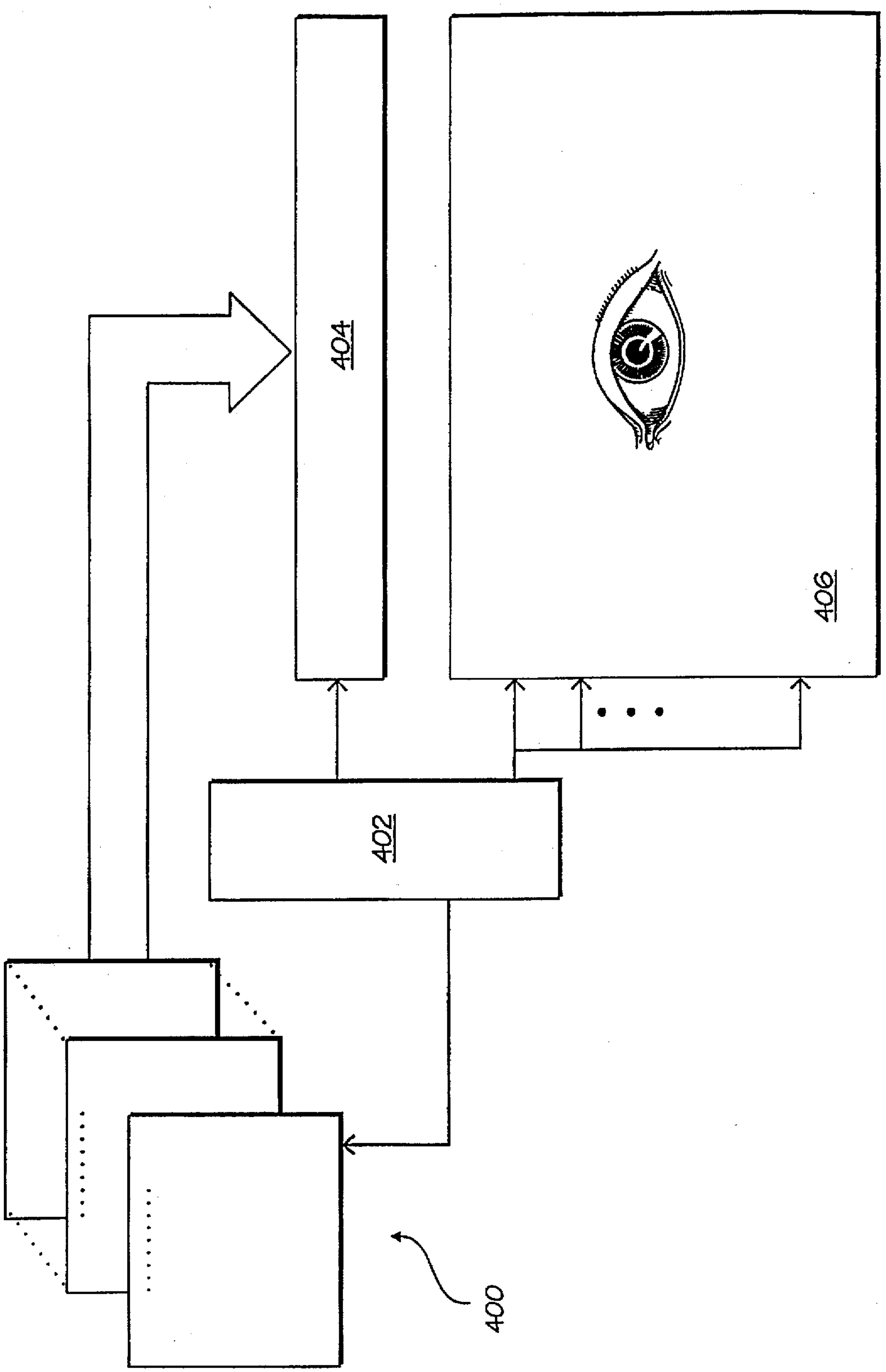
FIG. 4 shows a block diagram of an apparatus for carrying out the present invention.

The display apparatus of the present invention includes an image memory 400 as shown in FIG. 4. The image memory 400 can be any convenient memory type including semiconductor memory such as RAM, including but not limited to DRAM, SRAM or VRAM, or a non-semiconductor memory such as a hard disk, floppy disk or optical disk, with or without intermediate processing (e.g., MPEG decompression). The image memory 400 is shown in FIG. 4 as having multiple planes. This plane metaphor is used conceptually to show that each pixel includes multiple data bits for the various bits of the weighted PWM scheme; it will be apparent to those of ordinary skill in the art that any convenient organization of the graphical image data in the image memory 400 can be used.

Under control of a control circuit 402, data is transferred from the image memory 400 into a register 404. Once the register is full, and at an appropriate time according to a clock signal generated by the control circuit 402, the data in the register 404 is coupled to illuminate pixels in the appropriate row of the display 406. The display retains data of a pixel state written to the rows until they are updated in a subsequent cycle. In the preferred embodiment the register 404 contains 1280 latch and driver circuits that buffer the memory bus to the column connections of the display. As discussed in the background section of this patent document, if all 1280 latches must be loaded with data during the shortest event duration, the bandwidth requirements for the electronics becomes too severe for an economical solution.

Figure 5:
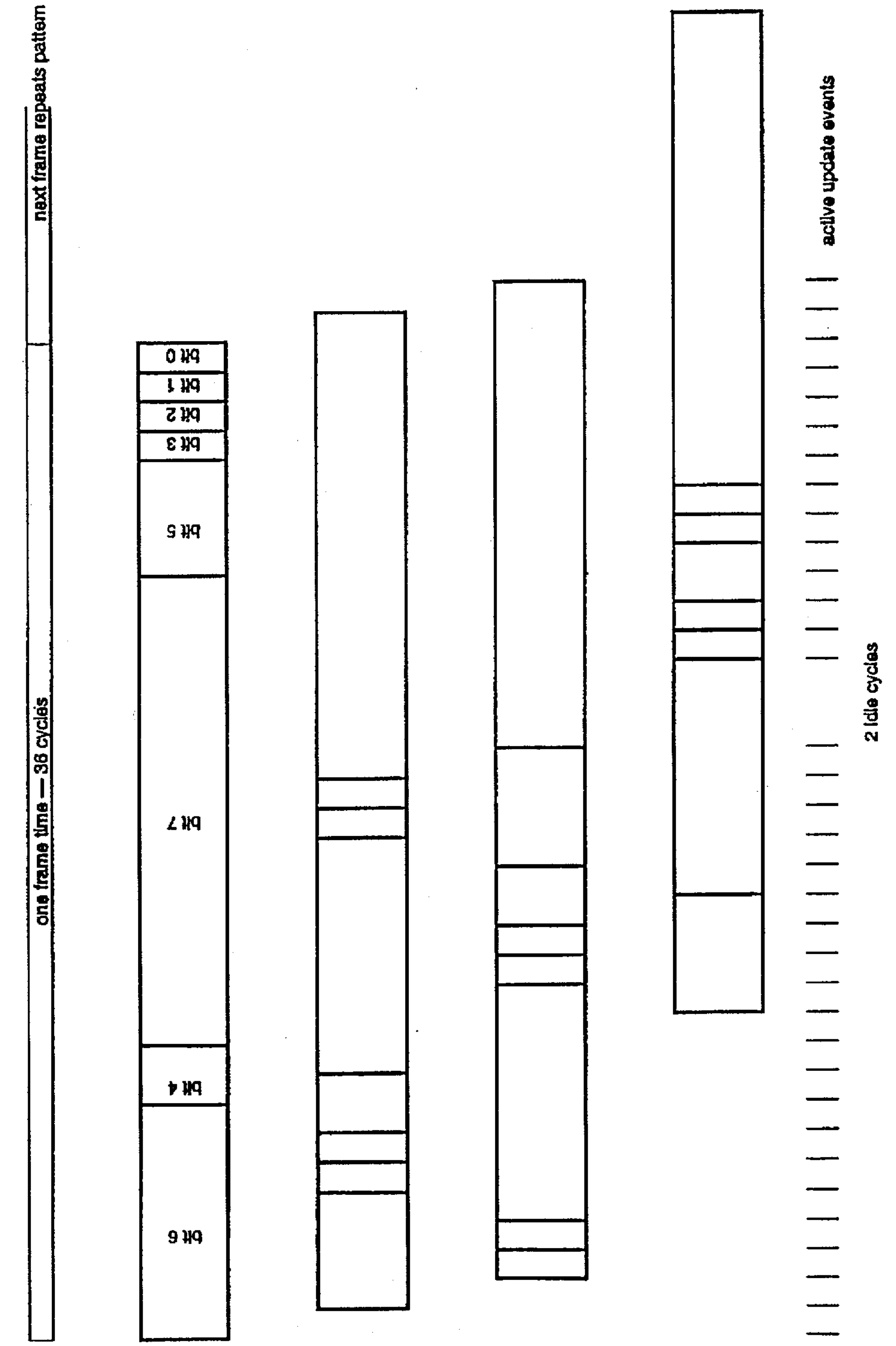
FIG. 5 shows a timing diagram for a pseudo-random binary weighted PWM scheme according to one embodiment of the present invention.

To reduce the bandwidth requirements of such a system, the present invention re-orders the time during which the bits of the various weights are displayed in comparison to the prior art. Because the frame time is sufficiently short so that the viewer's eye/brain system can integrate the displayed image into the appropriate shades of gray, the presentation order of these bits does not affect the image quality. FIG. 5 shows one example of an 8-bit binary weighted PWM scheme for four rows of data according to one embodiment of the present invention. As FIG. 5 clearly shows, the shortest event is not repeated in the same time slot during any of the four rows. It will be apparent to one of ordinary skill in the art after reading this disclosure that the order of the weighted bits can be selected for optimization of different characteristics, such as bandwidth or visual effect.

Figure 6A:
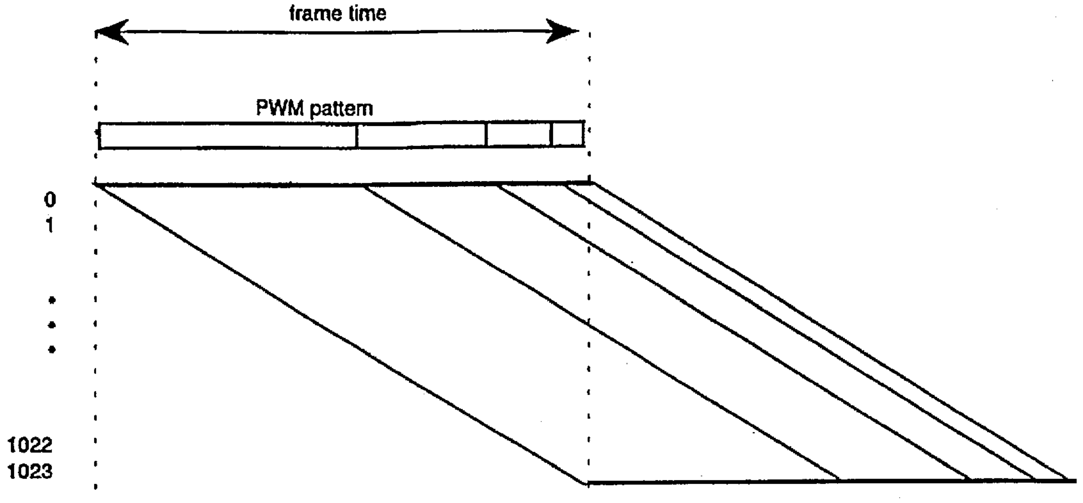
FIG. 6A shows a timing diagram for a weighted PWM scheme according to the preferred embodiment of the present invention.

FIG. 6A shows another scheme for selecting the data to be loaded into the register without the necessity of performing a complex optimization scheme. Only the first eight rows of the row of data are shown in this Figure. Immediately before time zero, the bit in the register that corresponds to row 0 is loaded with the data for the 0th weight bit, the register bit for row 1 is loaded with the 3rd weight bit, the register for row 2 is loaded with the 2nd weight bit, the register for rows 3–6 are loaded with the 1st weight bits and row 7 is loaded with the 0th weight bit. During the next clock cycle the data in rows 1 and 2 changes such that row 1 is loaded with the data for its 0th weight bit and row 2 is loaded with the 3rd weight bit. At time one, this new data is clocked into the display. During the next clock cycle, only the data in rows 2 and 3 changes, and so forth. In this way, the number of data transitions per clock cycle is dramatically reduced and the data can be extracted from the memory in a regular fashion.

Figure 6B:
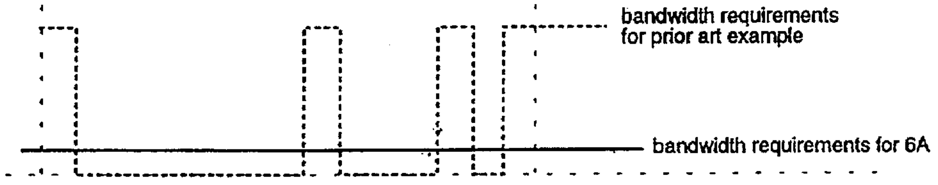
FIG. 6B shows a bandwidth requirement diagram for a system built according to the the timing diagram of FIG. 6A.

FIG. 6B shows a bandwidth requirement diagram for a system built according to the the timing diagram of FIG. 6A. As discussed above the bandwidth requirements of a system built according to the embodiment of FIG. 6A are reduced. Here, as shown in FIG. 6B, the bandwidth requirement becomes constant; there are no 'dead times' as shown in the prior art of FIG. 3C.

Figure 6C:
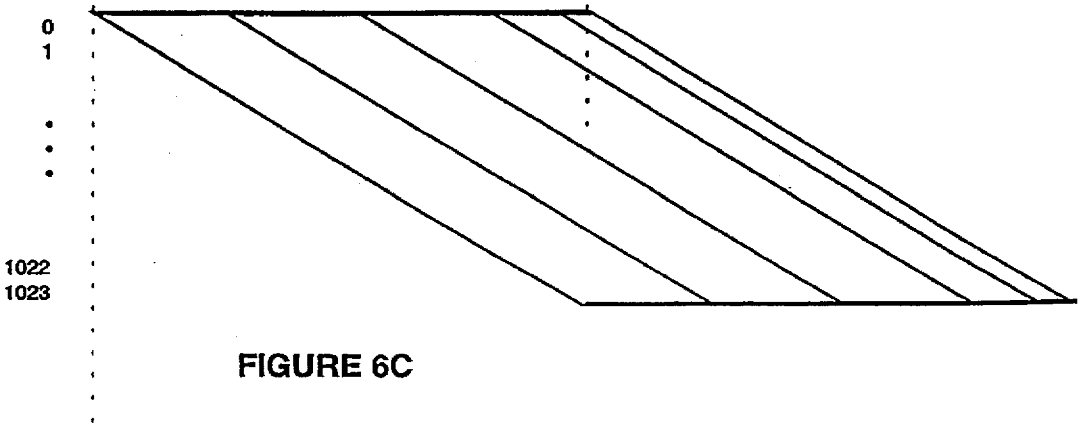
FIG. 6C shows an alternate timing diagram for a weighted PWM scheme according to the present invention.

Depending upon the clock rate, a display operating according the scheme of FIG. 6A could form a flicker in the image if only the longest duration bit is displayed. A display operating under this condition would necessarily have the bit on essentially half the time. Under such a condition, the on-off cycle could be sufficiently slow that it could be sensed by a human eye causing psycho-visual problems for a viewer. Such a circumstance forms an undesirable image. Additionally, this image can negatively impact the users by causing a headache or the like. FIG. 6C shows an alternative scheme to that of FIG. 6A. According the the scheme of FIG. 6C, the longest duration bit 602 is split into two (or more) time-separated display periods. In the example shown in FIG. 6C, the next shortest bit 604 is displayed between the two halves of the longest duration bit 602. The third longest duration bit 606 and the shortest duration bit 608 follow the second half of the longest duration bit 602. In this way, even if only the longest duration bit is displayed, its duty cycle is the same but the duration of each on-off cycle is sufficiently shortened to avoid forming a flicker.

Figure 7A:
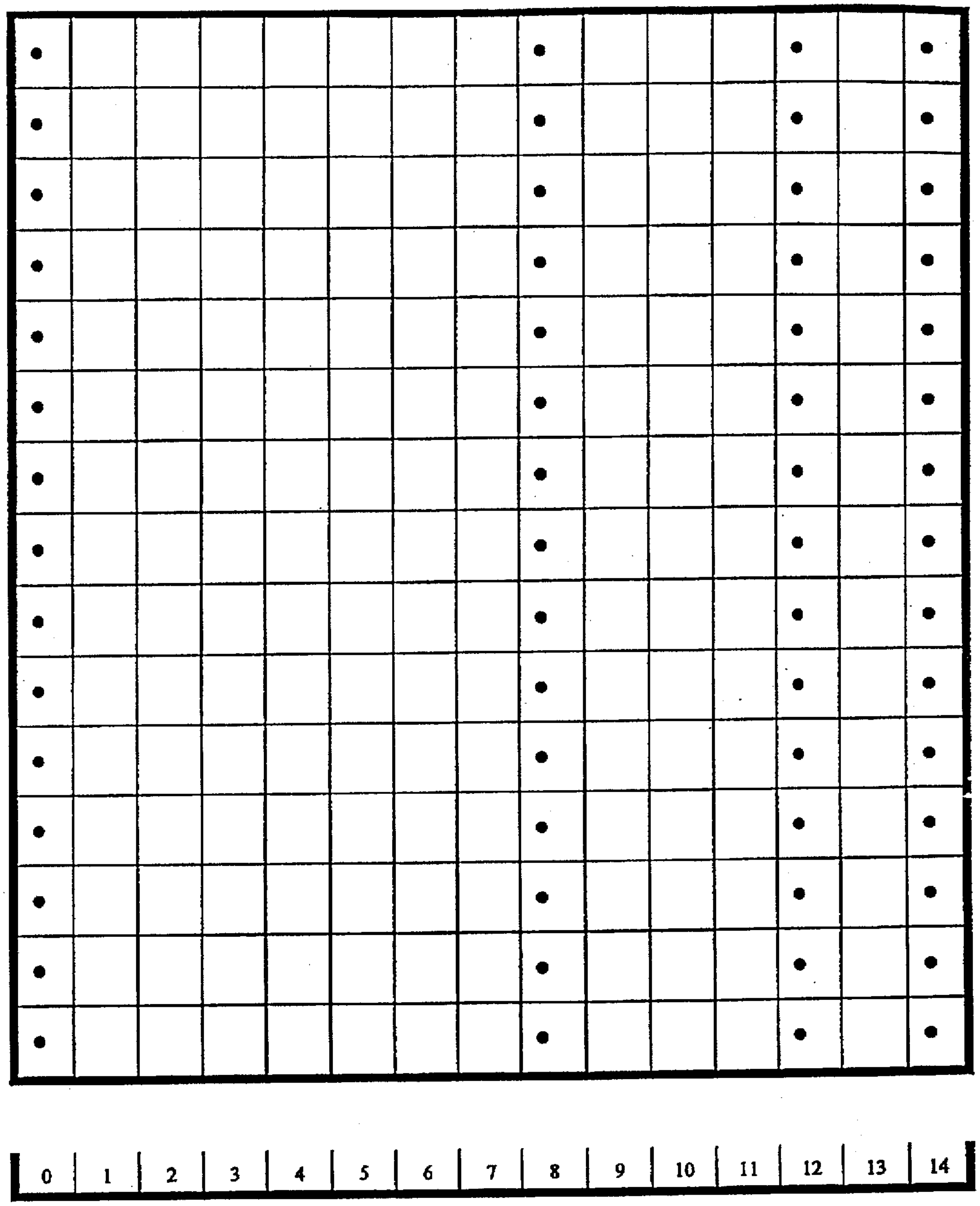
FIG. 7A shows a conventional timing diagram for a weighted PWM scheme.
Figure 7B:
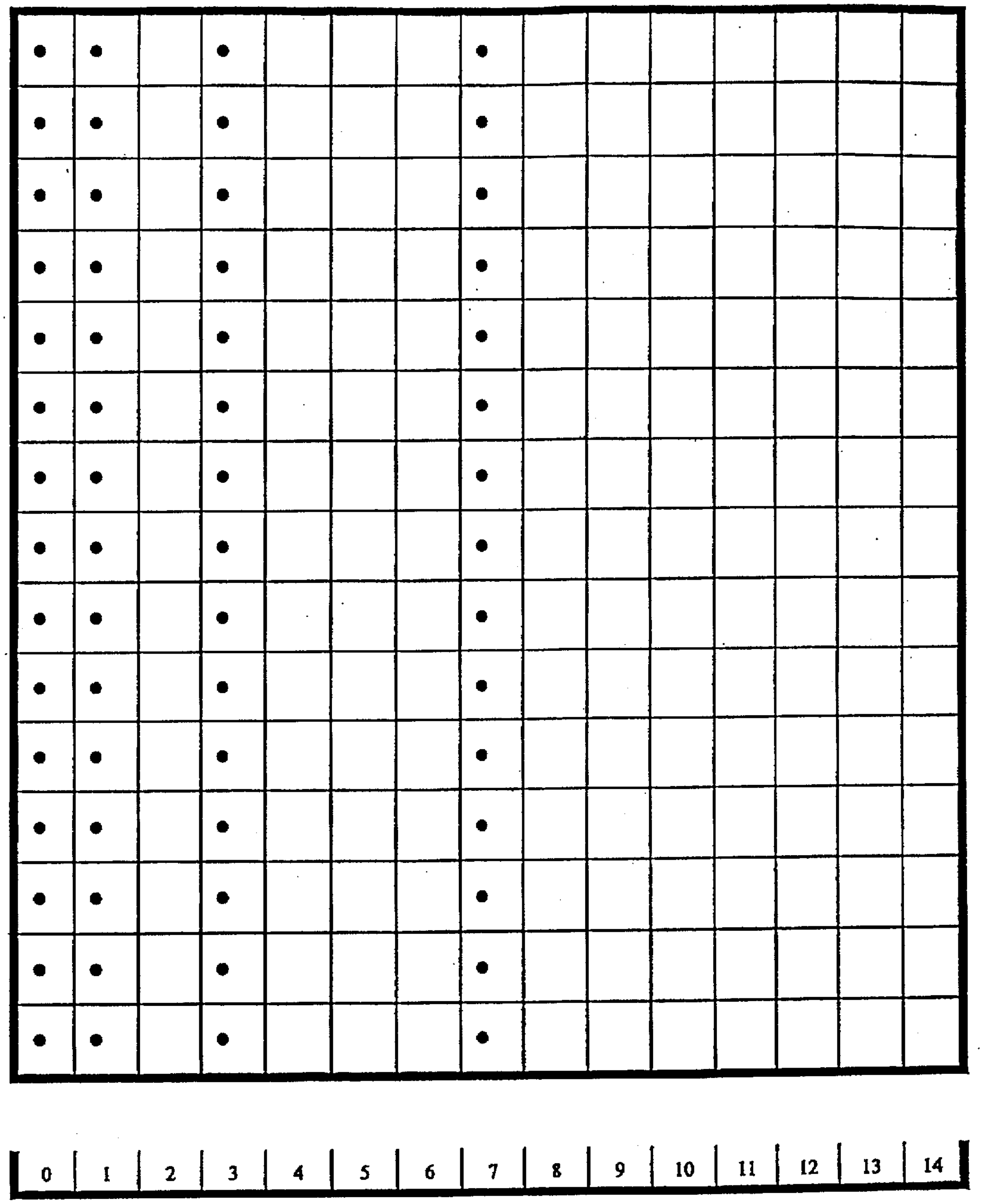
FIG. 7B shows a conventional timing diagram for a weighted PWM scheme using reverse ordering from the timing shown in FIG. 7A.

Referring back to FIG. 3, it is apparent using an ordinary gray scale implementation that the bandwidth limit occurs for a conventional display resulting to having to perform all the shortest event operations concurrently. Consider for example, a display that is fifteen rows long and has four bits of gray scale weighting. FIGS. 7A and 7B show the timing for loading the data for the rows of this small display according to a prior art PWM scheme. As discussed above, the time to display a frame is divided into ($2^n$−1) segments. In FIG. 7A, all fifteen rows display the data for the longest event during the time segment zero. All fifteen rows display the data for the next longest event during the time segment eight. All fifteen rows display the data for the third longest event during the time segment twelve. All fifteen rows display the data for the shortest event during the time segment fourteen. FIG. 7B shows the same prior art PWM timing as FIG. 7A except that the shortest event is displayed first. In FIG. 7B, all fifteen rows display the data for the shortest event during the time segment zero. All fifteen rows display the data for the next shortest event during the time segment one, for the third shortest event during the time segment three and for the longest event during the time segment seven.

Figure 8:
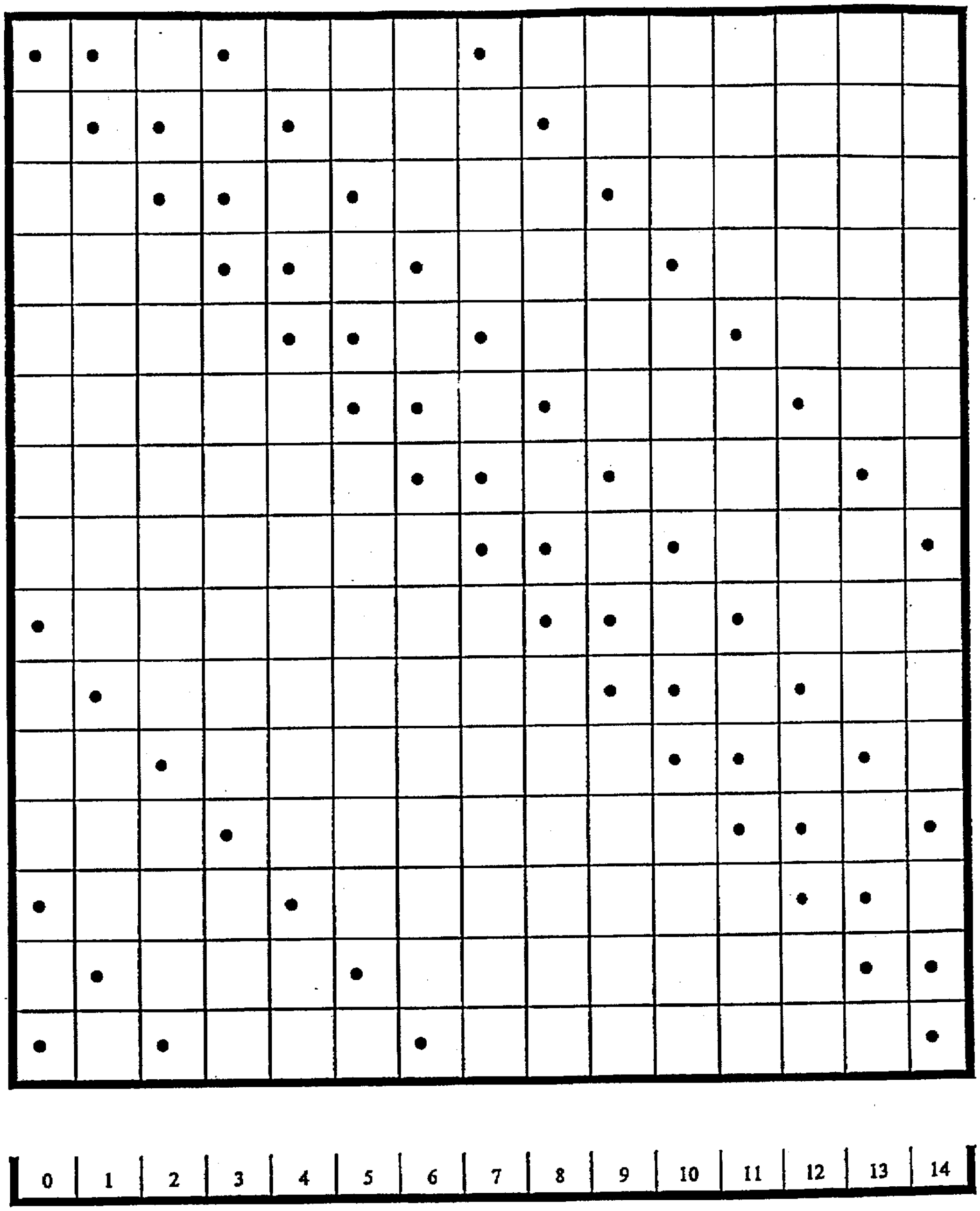
FIG. 8 shows a timing diagram according to a non-binary weighted embodiment of the present invention.

FIG. 8 shows the timing necessary for loading the data for the rows of this small display according to one non-binary embodiment of the present invention. The timing diagram for FIG. 8 shows that the bandwidth requirement for the display system are considerably reduced by not having all the shortest duration events displayed at the same time. During each of the fifteen time segments there are only four display events. During the time segment zero, there are four events displayed: for rows zero (the shortest event gray scale), eight (the longest event gray scale), twelve (the third shortest event) and fourteen (the second shortest event). During the time segment one there four events are displayed: for rows zero (the second shortest event), one (the shortest event), nine (the longest event) and thirteen (the third shortest event). During the time segment two only four events are displayed: for the rows one (the second shortest), two (the shortest), ten (the longest) and fourteen (the third shortest). This timing for displaying the rest of the frame is shown in the remainder of the drawing.

Figure 9:
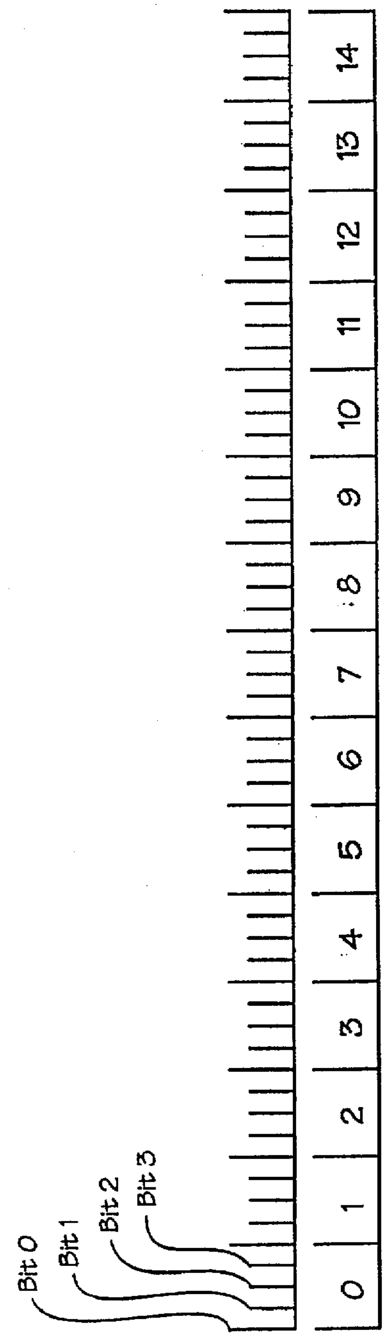
FIG. 9 shows a timing diagram of the relative starting points within a time segment according to the preferred embodiment of the present invention.

It should be readily apparent to one of ordinary skill in the art that the bandwidth for this system is significantly reduced over that of FIG. 7A or 7B. Rather than requiring 15 events to occur within one time segment, only four events are needed. It should also be apparent that the four events within a single time segment cannot occur at precisely the same time. To accommodate the necessary four occurrences within each time segment, the time segments are further divided into four equal portions. Each portion is for one of the four bits of the gray scale. The row having the event for displaying the shortest event will receive its display data during the first one-fourth of each event. The row having the event for display the next shortest event during the second one-fourth, and so on. FIG. 9 shows a time chart for a single row of a display according to FIG. 8.

The number of rows that can be drawn according to the present invention is equal to the number of time segments. Because of the nature of conventional PWM weighting, only $2^n$−1 time segments are available, where n is the number of bits of gray scale. For example, in FIG. 8, because 4 bit gray scale is used, only 15 rows can appear in the display. To provide for more rows, for example 30 rows, the timing for drawing the two halves of the array must be interleaved. The granularity of gray scale is a function of the number of rows in the display or the number of rows in the video format.

Figure 10:
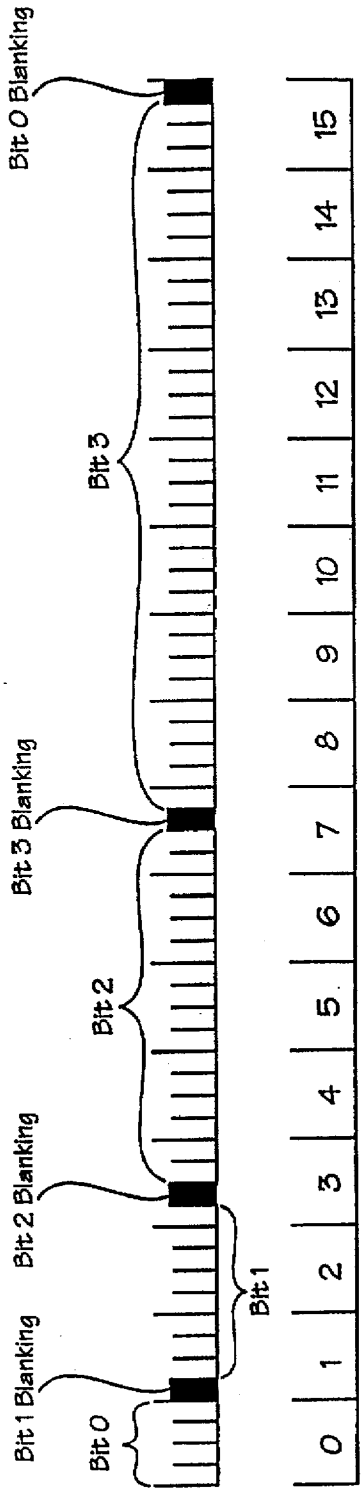
FIG. 10 shows a timing diagram, including the timing for clearing data according to the present invention.
Figure 11:
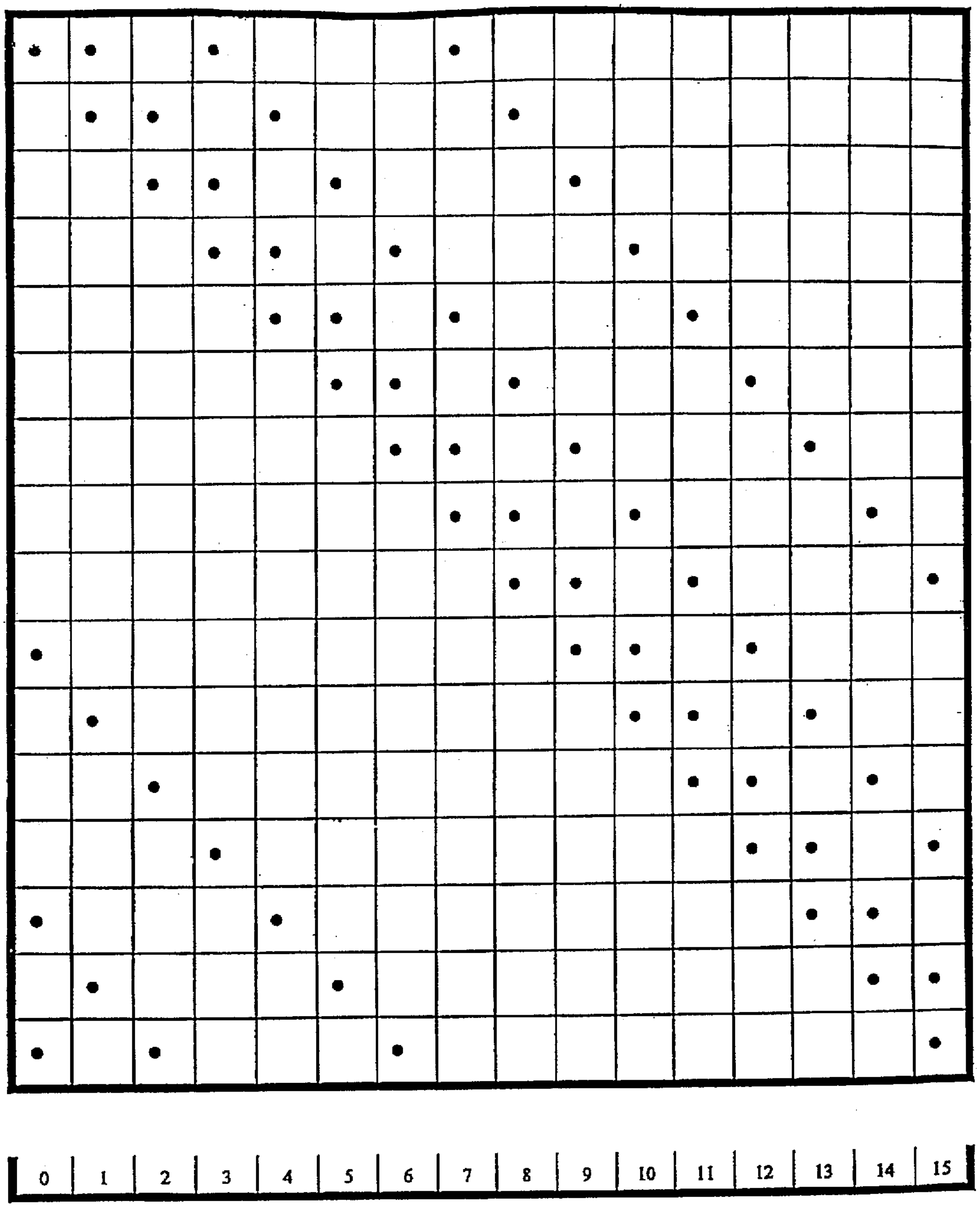
FIG. 11 shows a timing diagram for the preferred embodiment of the present invention.

According to the preferred embodiment of the present invention, each row of bits is first blanked before each new display event. FIG. 10 shows a modified time chart for a single row of a display which includes these blanking times. Preferably, the total blanking time for displaying the gray scale for a row is equal to one time segment. Because there is one blanking time of duration 1/n for each bit of gray scale one full time segment is added. Thus, as shown in FIG. 10, the preferred embodiment includes $2^n$ time segments rather than $2^n$−1 as found in the prior art. Accordingly, this embodiment can readily support drawing sixteen rows as shown in FIG. 11 rather than the fifteen rows shown in FIGS. 7A, 7B and 8. Referring now to FIG. 10, the timing can be seen for a single row having its shortest event first. Bit zero (the shortest event) is displayed during the first time segment. Next, the blanking period is provided for bit 1 for a duration of ¼ time segment. Then, bit 1 is displayed for a total period of 2 time segments. This sequence continues for the remaining bits of gray scale control.

FIGS. 7A, 7B, 8 and 11 imply that the rows of an entire frame image are all simultaneously displayed. In the preferred embodiment, the data for each frame is received serially. FIG. 6 shows a time line representation for the timing of data presentation of the rows in a display. The shaded portion 600 of FIG. 6 shows the collection of data and their respective timing for forming a single frame image. As the first row of a new frame image is drawn onto the display, the remaining portion of the previous frame image is still being displayed.

Figure 3A:
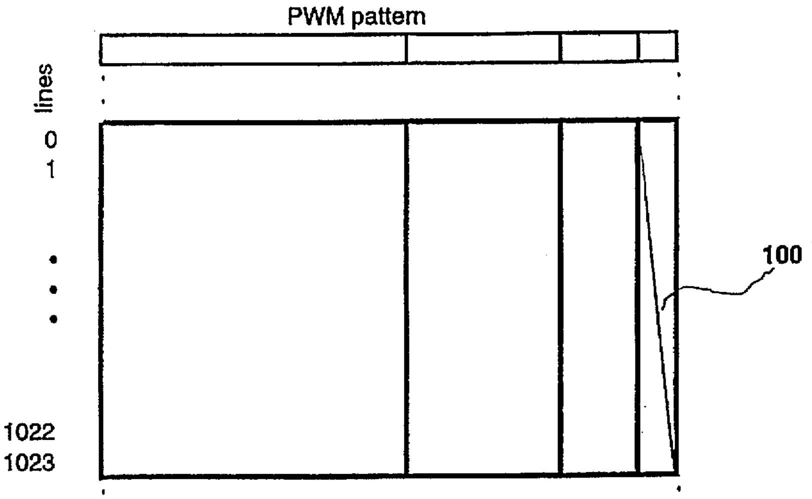
FIG. 3A shows a timing diagram for a weighted PWM scheme viewed according to conventional consideration.
Figure 3B:
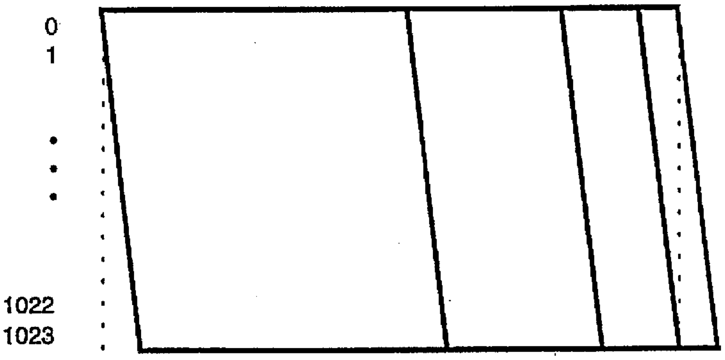
FIG. 3B shows the timing diagram of FIG. 3A viewed as the events actually occur in time.
Figure 3C:
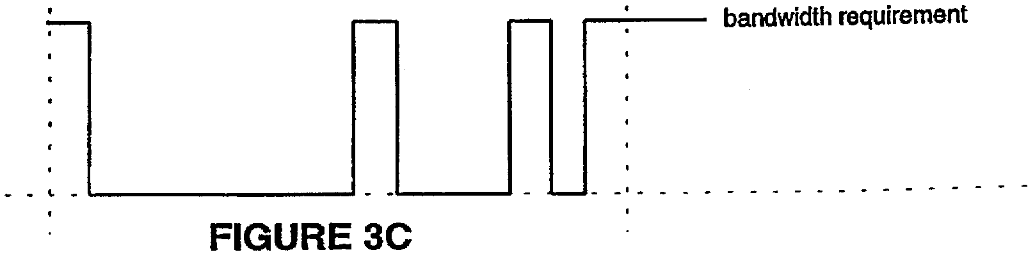
FIG. 3C shows a bandwidth requirement diagram for a system built according to the the timing diagram of FIG. 3B.

Another way to consider the timing of the prior art is shown below in Table I. Table I shows the timing for displaying the lowest order bit according to the scheme of FIG. 7B. According to Table I, each data bit is sequentially loaded into each row as also shown in FIG. 3. To display a frame, 240 clock cycles are needed for 4 bit gray scale according to one version of the prior art.

TABLE I

| time | row | bit |
|---|---|---|
| t1 | r1 | b0 |
| t2 | r2 | b0 |
| t3 | r3 | b0 |
| t4 | r4 | b0 |
| t5 | r5 | b0 |
| t6 | r6 | b0 |
| t7 | r7 | b0 |
| t8 | r8 | b0 |
| t9 | r9 | b0 |
| t10 | r10 | b0 |
| t11 | r11 | b0 |
| t12 | r12 | b0 |
| t13 | r13 | b0 |
| t14 | r14 | b0 |
| t15 | r15 | b0 |
| t16 | r16 | b0 |
| t17 | r1 | b1 |
| ... | ... | ... |

Table II shows the timing of the present invention. The timing for loading and for clearing the data is indicated such as graphically indicated in FIG. 10. Thus, for example at time 1 the data for Bit0, Row0 is loaded and data for Row15 is cleared. At time 2 the data for Bit1, Row15 is loaded and data for row 13 is cleared. This analysis continues for the remainder of Table II. To display a frame, 64 clock cycles are needed for 4 bit gray scale according to the preferred embodiment of the present invention.

TABLE II

| time | row | bit | clear |
|---|---|---|---|
| t1 | r0 | b0 | r15 |
| t2 | r15 | b1 | r13 |
| t3 | r13 | b2 | r9 |
| t4 | r9 | b3 | r1 |
| t5 | r1 | b0 | r0 |
| t6 | r0 | b1 | r14 |
| t7 | r14 | b2 | r10 |
| t8 | r10 | b3 | r2 |
| t9 | r2 | b0 | r1 |
| t10 | r1 | b1 | r15 |
| t11 | r15 | b2 | r11 |
| t12 | r11 | b3 | r3 |
| t13 | r3 | b0 | r2 |
| t14 | r2 | b1 | r0 |
| t15 | r0 | b2 | r12 |
| t16 | r12 | b3 | r4 |

The system shown in the Tables above is optimal for bandwidth. By that it is meant that there are $2^n$ rows where n is the number of bits of gray scale resolution. No idle periods are required that would otherwise reduce bandwidth. Also there are no unnecessary blank periods that reduce display efficiency. It will be apparent to those of ordinary skill in the art that integer multiples of $2^n$ rows can be included in a display according to these teachings with a resultant increase in bandwidth requirement directly proportional to the integer multiple. A second but related problem is where the gray scale requirement is not matched by the number of rows, eg., there are less than $2^n$ rows or there is a non-power-of-2 gray scale. All of these system design issues are said to be for a non-matching gray scale-display system.

There are several ways to handle a system having a non-matching gray scale-display system. Virtual lines can be added to the display sequence to match the gray scale resolution requirement. It will be understood that these virtual rows are not display but rather add only to the sequence of events for forming the display image. For example, if only 480 lines comprise a frame, and the cycle time is adjusted to represent 512 lines per frame, the a 6% increase in bandwidth results. In this case 6% of the possible update cycles are not used for writing data to the display.

A second approach for resolving a non-matching gray scale-display system is to use the granularity provided by the total number of rows. To achieve this, the gray scale definition can be reduced and/or a higher bandwidth can be implemented. For example, a 480 row display would achieve nearly 9 bits of gray scale resolution (512 levels), but some of the binary codes would be missing while others would produce equal output brightness. Thus, if only 8 bit resolution is required, but 9 bits of gray scale are used to encode the 480 distinct values, a 12% increase in bandwidth results.

A third approach for resolving a non-matching gray scale-display system is to increase the duration of the least significant bits in combination with a clear behind technique such as taught in U.S. patent application, Ser. No. 08/482,192, filed Jun. 7, 1995, and entitled CLEAR-BEHIND MATRIX ADDRESSING FOR DISPLAY SYSTEMS. Such a system can provide a bandwidth optimal system for a non-power-of-2 number of rows but reduces the optical efficiency.

The present invention has been described relative to a preferred embodiment. Improvements or modifications that become apparent to persons of ordinary skill in the art only after reading this disclosure are deemed within the spirit and scope of the application.

What is claimed is:

1. A method of forming a plurality of pulse width modulating signals for delivery to a digital display having a plurality of rows and a plurality of columns, wherein the display is configured to receive the pulse width modulating signals a row of pixels at a time, the method comprising the steps of:

a. receiving a predetermined number of bits for each signal, wherein the bits are sufficient for defining the signal, such that each one of the bits represents a different duration event;

b. storing the bits;

c. writing data to all the rows, one row at a time, the step of writing comprising selecting a collection of bits for each pixel in a row for forming a signal of a predetermined duration;

d. forming a plurality of signals, one for each of the collection of bits, of a duration representative of the collection of bits and coupling the signals to a predetermined one of the rows of the display; and e. selecting a replacement collection of bits for any event that will expire at a next clock pulse wherein at least three consecutive collections of bits are displayed for a different duration.

2. An apparatus for providing an n-bit weighted pulse width modulation to each of m signal lines wherein each signal line is configured to received n signals for displaying bits of varying duration having a shortest duration to a longest duration, which are representative of m×n pulse width modulated data bits, comprising a control circuit for selecting a first collection of data bits each representing a varying duration, for forming a corresponding first collection of signals for displaying a predetermined row of bits for a predetermined duration, and for subsequently displaying in remaining rows, subsequent collections of bits wherein at least three consecutive collections are for bits of different duration.

3. The apparatus according to claim 2 wherein a bandwidth requirement to accommodate displaying the subsequent collection of bits is less than if all shortest duration bits are successively displayed.

4. The apparatus according to claim 3 wherein the bandwidth requirement is constant.

5. The apparatus according to claim 2 wherein only bits for event durations which are expiring during a next clock cycle are selected.

6. The apparatus according to claim 5 wherein the signals are coupled to modulate a plurality of pixels in a display for forming a gray scale image.

7. The apparatus according to claim 6 wherein the pixels are arranged in a plurality of rows and columns and further comprising a register having a plurality of storage elements, one for each pixel in a row.

8. The apparatus according to claim 5 wherein the signals are coupled to modulate a plurality of pixels in a display for forming a predetermined color.

9. The apparatus according to claim 8 wherein the pixels are arranged in a plurality of rows and columns and further comprising a register having a plurality of storage elements, one for each pixel in a row.

10. The apparatus according to claim 2 wherein the control circuit selects the set of selected bits according to a predetermined algorithm.

11. The apparatus according to claim 10 wherein only bits for event durations which are expiring during a next clock cycle are selected.

12. The apparatus according to claim 11 wherein the signals are coupled to modulate a plurality of pixels in a display for forming a gray scale image.

13. The apparatus according to claim 12 wherein the pixels are arranged in a plurality of rows and columns and further comprising a register having a plurality of storage elements, one for each pixel in a row.

14. The apparatus according to claim 11 wherein the signals are coupled to modulate a plurality of pixels in a display for forming a predetermined color.

15. The apparatus according to claim 14 wherein the pixels are arranged in a plurality of rows and columns and further comprising a register having a plurality of storage elements, one for each pixel in a row.

16. An apparatus for providing weighted pulse width modulation to each of a plurality of signals within a frame time, comprising:

a. a memory for storing a plurality of collection of data bits representative of each of the signals wherein each of the collections comprises a like number of bits such that each bit in a collection represents one of a predetermined different event duration;

b. a selecting circuit for selecting from a first subset of the plurality one bit per collection forming a first set of selected bits all having a predetermined event duration; and c. a circuit for generating a plurality of modulated signals corresponding to the selected bits; and d. a control circuit for controlling the selecting circuit to select from a second subset of the plurality one bit per collection forming a second set of selected bits such that only those bits are replaced during a next clock cycle for which the different event duration will expire at a next clock pulse and further wherein only one set of bits can expire at any one clock pulse.

17. The apparatus according to claim 16 wherein a bandwidth requirement to accommodate selecting the second set of selected bits is less than if all shortest duration bits are successively selected.

18. The apparatus according to claim 17 wherein the bandwidth requirement is constant.

19. The apparatus according to claim 16 wherein the signals are coupled to modulate a plurality of pixels in a display for forming a gray scale image.

20. The apparatus according to claim 19 wherein the pixels are arranged in a plurality of rows and columns and further comprising a register having a plurality of storage elements, one for each pixel in a row.

21. The apparatus according to claim 16 wherein the control circuit selects the set of selected bits according to a predetermined algorithm.

22. The apparatus according to claim 21 wherein the signals are coupled to modulate a plurality of pixels in a display for forming a gray scale image.

23. The apparatus according to claim 22 wherein the pixels are arranged in a plurality of rows and columns and further comprising a register having a plurality of storage elements, one for each pixel in a row.

24. A display comprising:

a. an array of pixels arranged in a plurality of rows and a plurality of columns;

b. a register having a plurality of storage elements for temporarily storing data, the register having as many storage elements as pixels in a row;

c. a control circuit coupled to the memory and to the register for controlling a transfer of the data into a predetermined one of the rows;

d. a memory for storing a collection of bits for each of the pixels wherein each of the collections comprises a like number of bits such that each bit in a collection represents one of a predetermined different event duration; and e. a selection circuit for selecting one bit per row forming a set of selected bits having a predetermined event duration, and then for a different row selecting a new set of selected bits such that only those bits are replaced for which the different event duration has expired.

25. The apparatus according to claim 24 wherein a bandwidth requirement to accommodate displaying the subsequent collection of bits is less than if all shortest duration bits are successively displayed.

26. The apparatus according to claim 25 wherein the bandwidth requirement is constant.

27. A method of forming a plurality of pulse width modulating signals comprising the steps of:

a. storing a predetermined number of bits for each signal, wherein the bits are sufficient for defining the signal, such that each one of the bits represents a different duration event;

b. selecting a collection of bits, one for each signal, such that bits for at least two different duration events are selected; and c. selecting a replacement bit for any event that will expire at a next clock pulse.

* * * * *

UNITED STATES PATENT AND TRADEMARK OFFICE

CERTIFICATE OF CORRECTION

PATENT NO. : 5,731,802

DATED : March 24, 1998

INVENTOR(S) : Aras et al.

It is certified that error appears in the above-identified patent and that said Letters Patent is hereby correct as shown below:

On the title page, item [75] Inventors: delete "Straker" and insert --Staker--.

Signed and Sealed this

Twenty-third Day of March, 1999

Attest:

Q. TODD DICKINSON

*Attesting Officer* *Acting Commissioner of Patents and Trademarks*